United States Patent [19]
Harrell et al.

[11] 3,726,345
[45] Apr. 10, 1973

[54] PEANUT DIGGER SHAKER INVERTER

[75] Inventors: Larry D. Harrell; Jesse Daniels, both of Albany, Ga.

[73] Assignee: Lilliston Corporation, Albany, Ga.

[22] Filed: Apr. 26, 1971

[21] Appl. No.: 137,552

[52] U.S. Cl. .................................................171/101
[51] Int. Cl. ..............................................A01d 29/00
[58] Field of Search..........................171/101, 11, 18, 171/23, 35, 40, 65, 102, 117, 138, 116, 61

[56] References Cited

UNITED STATES PATENTS

| | | | |
|---|---|---|---|
| 3,260,314 | 7/1966 | Edwards | 171/101 |
| 1,078,435 | 11/1913 | Hale | 171/102 |
| 3,473,615 | 10/1969 | Harrell | 171/116 |
| 3,469,634 | 9/1969 | Whitesides | 171/101 |
| 3,181,617 | 5/1965 | Wallace | 171/61 |

*Primary Examiner*—Antonio F. Guida
*Attorney*—Newton, Hopkins & Ormsby

[57] ABSTRACT

A root crop harvesting apparatus operable for digging root crops from a pair of adjacent rows, conveying the dug root crops upwardly along inclined spaced parallel paths to an elevated position and discharging the plants for fall by gravity to the ground. Digging means are operatively associated with the harvesting apparatus for digging and removing root crop plants from their growing implacement in the ground. Conveying means are operatively associated with the harvesting apparatus for engaging the root crop plants, uprooted by the digging means, and operable for conveying the plants upwardly along the spaced parallel paths to the elevated position and operable for simultaneously separating soil therefrom. Plant deflecting means are operatively associated with the harvesting apparatus for contacting plants moving along the spaced parallel paths and operable for effecting an angular displacement of the plants inwardly from their original upright position to a generally horizontal position, to cause them to lie down in the region between the spaced parallel paths so that the plants can be discharged in these positions. Rotatable disc directing means are operatively associated with the harvesting apparatus and located in a position to receive the plants discharged from the conveying means and for directing the plants rearwardly for fall by gravity to the ground. Windrowing means, including two sets of spaced tine assemblies which define a windrowing path therebetween, are operatively associated with the harvesting apparatus for engaging the crop root portion of the plant during fall by gravity to the ground for directing the crop root portion angularly so that the plants are inverted with all of the root crops being crowded together to form a single windrow centered between the rows being dug and with the crop root portions being elevated for maximum exposure and aligned along the top portion of the windrow.

40 Claims, 12 Drawing Figures

INVENTORS
LARRY D. HARRELL
JESSE (NMI) DANIELS

PEANUT DIGGER SHAKER INVERTER

BACKGROUND OF THE INVENTION

This invention relates to root crop harvesting apparatus operable for digging and conditioning root crop plants for drying and subsequent collection for threshing. More particularly, this invention is directed to a digger, shaker, windrowing and inverting apparatus for peanut plant row crops operable for digging peanut plants growing in a pair of adjacent rows, windrowing the dug peanut plants, and simultaneously drying and conditioning the peanuts for subsequent collection of the peanuts in a threshing operation.

In the process of harvesting peanut crops, the peanut laden plants are first dug and left on top of the ground for subsequent harvesting. Since several days may intervene between digging and combining, it is possible for the peanuts to rot if they remain directly in contact with the ground; and, for this reason, the digging of the peanuts is effected by machines which dig the plants, shake them to remove some or most of the soil which clings inevitably to the peanuts and then places the plants in generally upended position in one row so that the peanuts are well exposed for drying action. The dried peanuts and their attached vines are then picked up and separated by threshing equipment.

Machines for digging and windrowing peanut laden plants often are referred to as digger-shaker inverters and may employ various means for effecting the inversion of the plants and their placement in windrows. The simplest form of such inverting devices, and those least subject to malfunction and costly maintenance, take the form of a platform of tines projecting rearwardly from the elevated discharge end of the conveyor which receives the plants as dug and conveys them upwardly to the tines while shaking the plants to remove debris and soil therefrom. The platform of tines or guide fingers may be effective essentially alone, or in conjunction with conveyor discharge action, to provide the plant inverting action. In any case, the devices of the prior art tend to produce erratic inverting and, at best, to provide windrows in which peanuts are not uniformly elevated out of contact with the ground but are instead disposed more or less along the opposite sides of the windrow. This may be caused either by failure to fully invert the plants so that the vines are not directly beneath the peanuts, or by inverting action which is too strenuous, leading to the same results by reason of rotating the plants past the fully inverted position. These defects not only lead to inferior drying and consequent possibility of peanut damage by rotting, but also produce windrows which cannot be efficiently gathered by the threshing equipment.

SUMMARY OF THE INVENTION

The above indicated disadvantages of the prior art have been overcome by the present invention which basically includes an arrangement of a peanut digger-shaker inverter wherein the inversion of the plants of a pair of adjacent rows is so controlled as to cause the plants when discharged, to crowd together along a compact windrow in which all of the peanuts lie closely together along the top center portion of the windrow. In this way, the peanuts are exposed for maximum drying action and are, as well, most effectively placed for subsequent gathering and separation by the threshing equipment.

Essentially, the present invention involves an arrangement wherein the plants of two rows are dug and root or peanut portions deposited on a conveyor for movement along separate paths to a point of elevated discharge. One important feature of the present invention is the provision of deflecting means associated with the conveying means for contacting and effecting an angular displacement of the plants moving along the elevated path by the conveying movement to the elevated discharge position. Rotatable disc directing means are located on the harvesting apparatus in a position to receive the peanut vines discharged by the conveying means and operable for directing the vines in their angular oriented position rearwardly to the windrowing apparatus. The windrowing apparatus includes two sets of rearwardly directed tine means laterally spaced relative to each other to define a windrow space therebetween.

An additional important feature of the present invention is the frame support means provided for supporting the digging apparatus, conveying means, vine deflecting means, rotatable disc directing means and windrowing tine means in a compact operative arrangement which will provide maximum stability and control during operation.

Accordingly, it is a primary object of the present invention to provide a root crop harvesting apparatus which is operable for digging root crops from their growing implacement in the ground, orienting the plants in an inverted position with the root crop portion located above the plant portion and removing soil therefrom in the process.

Another object of the present invention is to provide a root crop harvesting apparatus which is operable for digging root crops from a pair of adjacent rows, forming the root crops from the two rows into a compact windrow located between the dug rows and simultaneously inverting the root crop in the windrow forming operation.

A further object of this invention is to provide a root crop harvesting apparatus which will effectively dig and remove a root crop from its growing implacement in the ground, advance the dug root crop upwardly along an inclined path, while simultaneously removing soil therefrom and orienting the root crop from a substantially upright position to a substantially horizontal position.

A still further object of this invention is to provide a root crop harvesting apparatus having deflecting means operable for effecting an angular displacement of a plant in response to conveying movement in a harvesting operation.

Still another object of this invention is to provide a root crop harvesting apparatus having effective windrowing means operable for windrowing root crop plants dug from a pair of adjacent rows, and in response to discharge by plant conveying means.

Yet another object of this invention is to provide a root crop harvesting apparatus having formed tine directing means operable for effecting an angular displacement of a root crop plant moving relative thereto and operable for simultaneously displacing the root crop plant from a first path of movement to a laterally displaced position for discharge.

Still another object of this invention is to provide a frame support means operable for supporting various components of a root crop digging, shaking and inverting apparatus.

An additional object of this invention is to provide a root crop harvesting apparatus which is simple in construction and operation, economical to manufacture and reliable in performance.

Still other objects and advantages of the details of construction will become apparent upon reading the following description of the illustrative embodiment embodying the principles of the present invention with reference to the attached drawings wherein like reference numerals have been used to refer to like parts throughout the several figures, and wherein:

DESCRIPTION OF THE ILLUSTRATIVE EMBODIMENT

Figure 1:
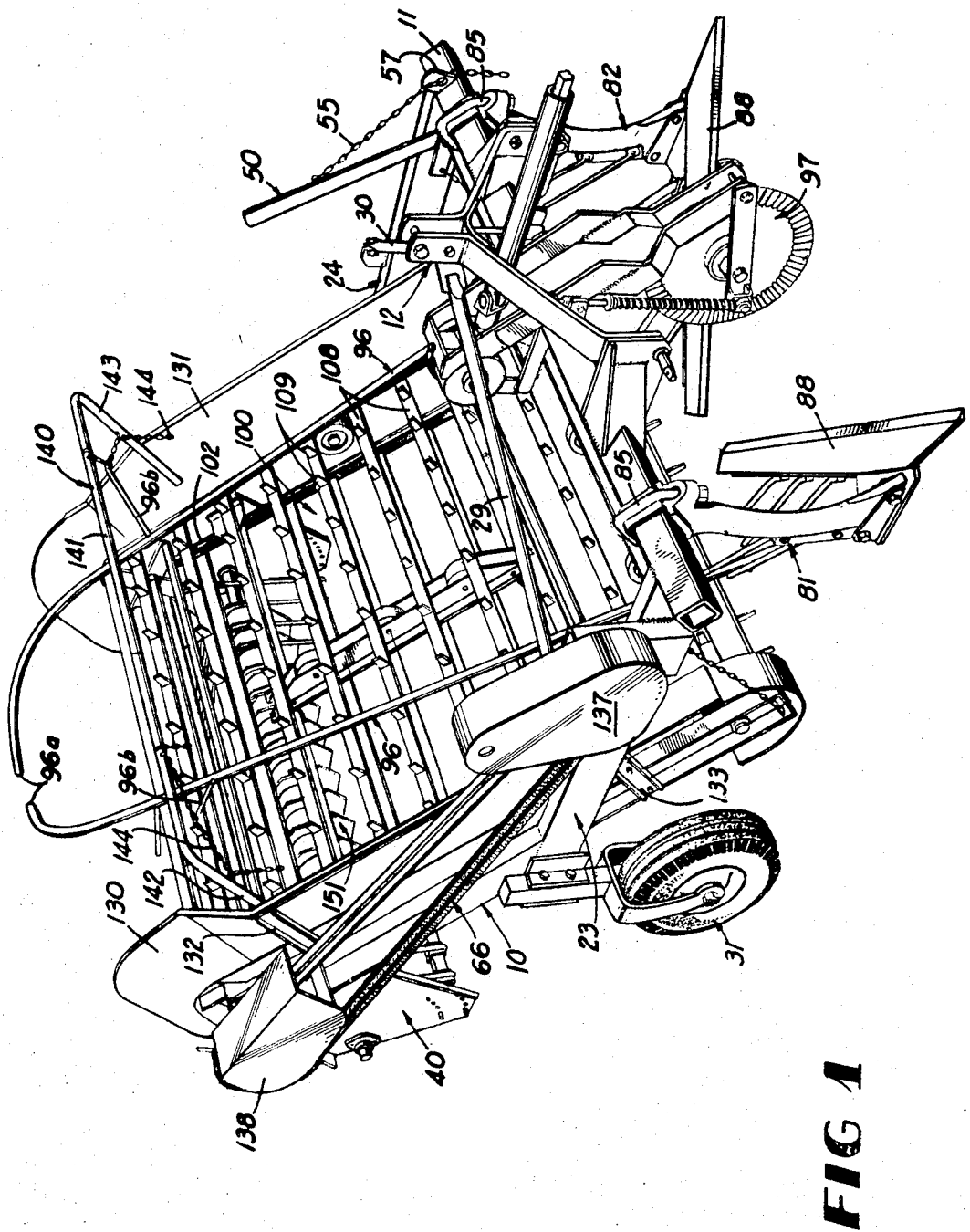
FIG. 1 is a perspective view of the root crop harvesting apparatus embodying the principles of the present invention.

Referring now to the drawings, an illustrative embodiment embodying the principles of the present invention will be described with reference to a frame support means 10, a peanut digging means 80, conveying mechanism 100 and windrowing means 150.

The function of the frame support means 10 is to provide a means for supporting the digging assembly 80, conveying mechanism 100 and windrowing means 150 in an operational relationship relative to each other and to provide attachment means whereby the frame support means 10 can be connected by a conventional three-point linkage system of a farm tractor for use in providing transport of the harvesting apparatus in a harvesting operation.

The function of the peanut digging means 80 is to sever the tap root system below the peanuts and to provide means for elevating the peanuts to a position above the ground.

The function of the conveying mechanism 100 is to elevate the dug peanuts received from the peanut digging assembly 80 upward to an elevated position and simultaneously remove soil therefrom in response to the conveying movement.

The function of the windrowing means 150 is to receive the peanuts discharged from the conveying mechanism 100 and to angularly orient the peanut plants such that the peanuts are inverted above the plant vine or foliage portion and for displacing the peanuts of two adjacent rows inwardly to form a compact windrow centered between the rows being dug with the peanuts being elevated for maximum exposure and aligned along the top portion of the windrow.

FRAME SUPPORT MEANS

Figure 2:
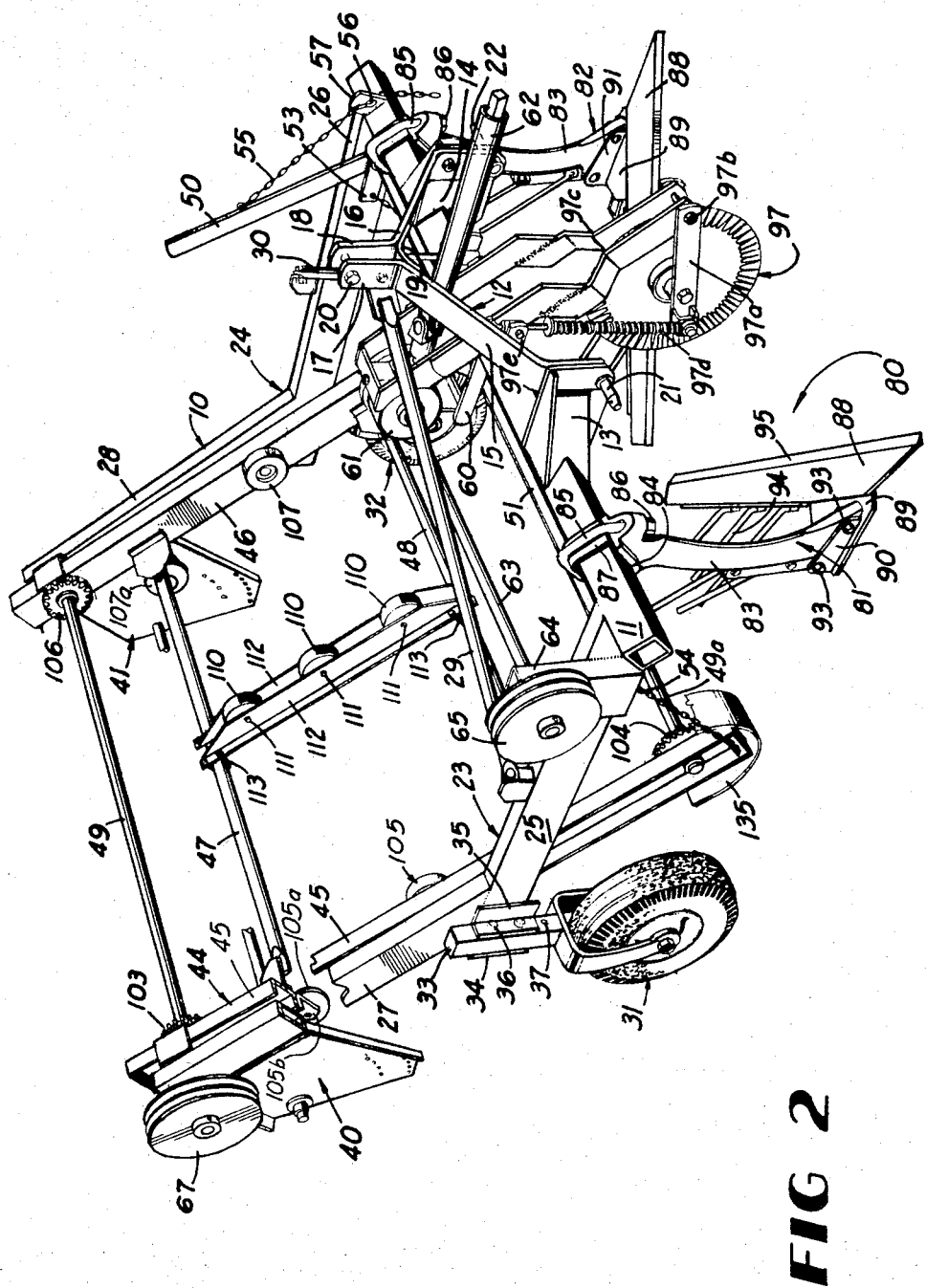
FIG. 2 is a perspective view similar to FIG. 1, with certain of the operable components removed therefrom to illustrate the frame support mechanism.

As shown in FIG. 2, the frame support means 10 includes a conventional tool bar 11 oriented in a substantially horizontal and transversely aligned position. A supporting mast 12 is provided adjacent an intermediate portion of tool bar 11 for providing attachment means whereby the tool bar 11 and frame means 10 can be supported by a three-point linkage of a farm tractor. The supporting mast 12 includes a pair of forwardly projecting and laterally spaced bracket members 13, 14 fixed to the tool bar 11. A pair of vertically oriented angle members 15, 16 are secured adjacent their lower end to an inside surface of brackets 13, 14, respectively, and extend upwardly in converging relationship relative to each other and terminate in parallel formed end portions 17, 18. The formed ends 17, 18 are slightly spaced horizontally relative to each other to define a connecting space therebetween. The two angle members 15, 16 are connected to each other adjacent their formed ends 17, 18 by means of a connecting element 19.

As shown in FIG. 2, a conventional connecting pin 20 is inserted through complementary openings (not shown) provided in upper extending ends of end portions 17, 18 for receiving the upper connecting link of a conventional three-point linkage support system.

A pair of outwardly directed connecting pins 21, 22 are provided in the mast 12, with one pin located in each of the support brackets 13, 14. Connecting pins 21, 22 are coaxially aligned relative to each other and provide a connecting means for receiving the two lower links of a conventional three-point support system.

As shown in FIG. 2, the frame support means 10 includes a pair of rearwardly extending frame elements 23, 24. Frame elements 23, 24 are connected adjacent opposite extended ends of the tool bar 11 and extend rearwardly therefrom in substantially parallel relationship.

Each of the frame elements 23, 24 includes a first portion 25, 26, respectively, and a second extending portion 27, 28, respectively, which are upwardly inclined relative to extended ends of frame element portions 25, 26. The two frame element portions 25, 26 are supported in a common substantially horizontal plane with the two frame element extending portions 27, 28 being supported in a common upwardly inclined plane.

A pair of bracing rods 29, 30 are connected between the upright mast 12 and rearwardly displaced portions of the two frame elements 23, 24, to add reinforcing means to the frame support means 10.

A pair of wheel support assemblies 31, 32 are provided on the support frame, with one wheel being attached to each of the frame elements 23, 24 adjacent the point of intersection between the first frame element portions 25, 26 and the second frame element portions 27, 28. The supporting wheel assemblies 31, 32 are provided with a conventional vertical standard 33. Vertical standard 33 is secured between a pair of brackets 34, 35 by conventional connecting bolt means 36. Brackets 34, 35 are secured to the side of frame elements 23, 24. The vertical standard 33 is provided with a plurality of vertically spaced openings 37 which will permit the wheel support assemblies 31, 32 to be vertically adjusted relative to the supporting frame elements 23, 24.

A pair of downwardly extending frame plate members 40, 41 are secured beneath an extended end portion of frame elements 23, 24, as shown in FIG. 2. The plate frame members 40, 41 are provided for supporting the windrowing means 150, as will be described in more detail hereinbelow.

A subframe 44 is supported between the frame elements 23, 24 and provides means for supporting the conveying mechanism 100. The subframe 44 includes a pair of laterally spaced elongated channel-shaped support members 45, 46 which are secured to each other in laterally spaced relationship by means of a pair of rod members 47, 48. Rod members 47, 48 are secured to inwardly directed surfaces of the channel-shaped members 45, 46 by conventional means, such as welding (not shown). The subframe 44 is pivotally supported between upwardly and rearwardly extending ends of frame elements 23, 24 by means of a rotatable support shaft 49. Shaft 49 extends through bearing support means (not shown) provided in the frame elements 45, 46 and conventional bearing support means (not shown) provided in the frame elements 23, 24. Reference is made to U.S. Pat. No. 3,199,605 issued Aug. 10, 1965 for the details of construction of a bearing support means which can be used to support the subframe 44. The rotatable support shaft 49 with bearing means will provide an effective pivot support means which will permit the subframe 44 to be angularly displaced relative to the frame element support means 23, 24. A second rotatable support shaft 49a is supported in the lower ends of frame support members 45, 46 by a pair of adjustable bearing means, which will be described in more detail below in the description of the conveying mechanism 100.

Figure 4:
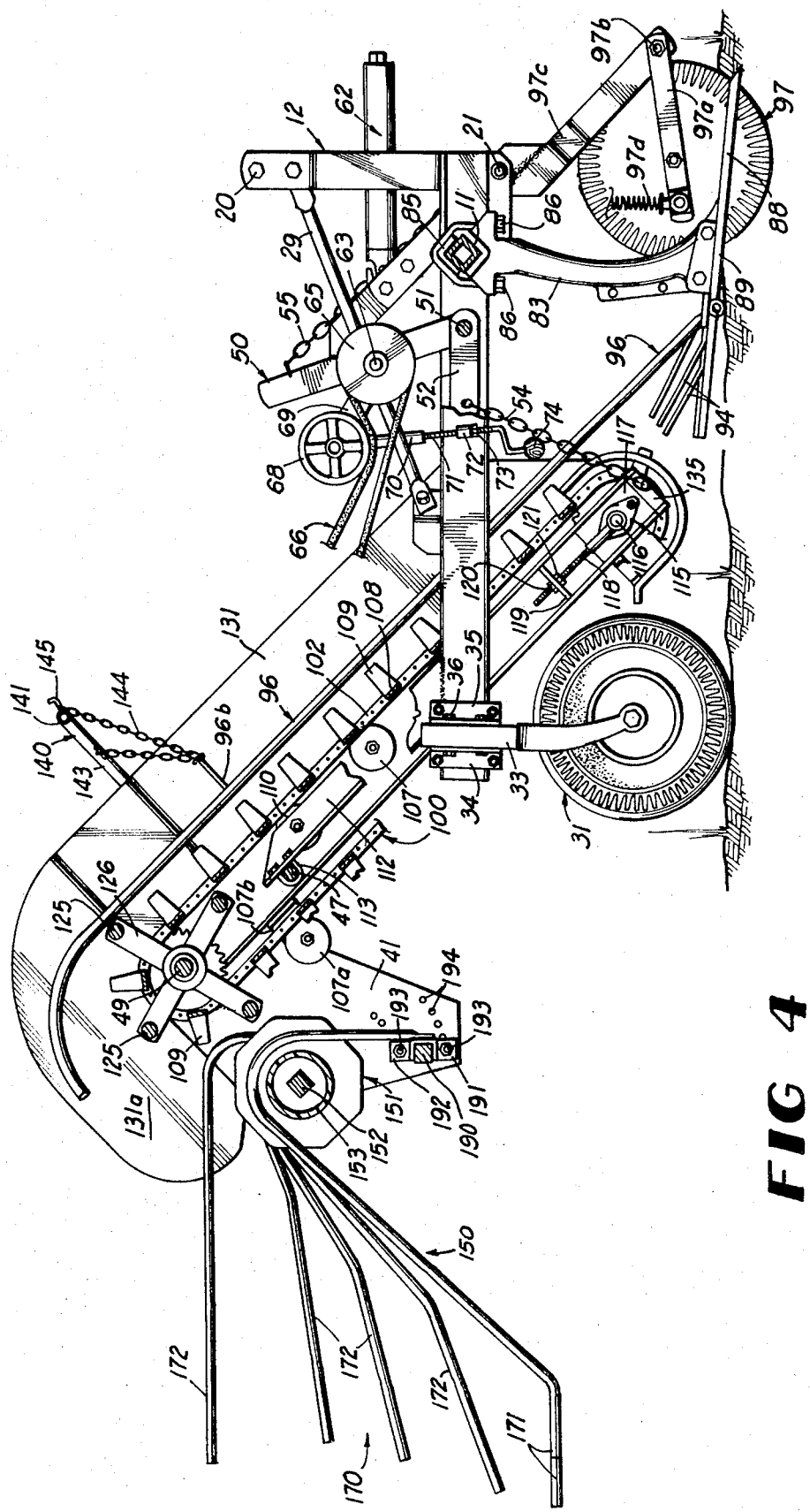
FIG. 4 is a vertical sectional view taken substantially longitudinally through the root crop harvesting apparatus with certain parts omitted for purpose of clarity.

As shown in FIGS. 2 and 4, adjustable means is provided for effecting angular displacement of the subframe 44 about the pivot support shaft 49. The adjustable means includes a control lever means 50 which is secured adjacent one end to a cross shaft 51. Shaft 51 is supported adjacent its opposite ends by conventional bearing means (not shown) within the frame elements 23, 24. Fixed to shaft 51 adjacent opposite ends thereof is a pair of rearwardly extending arms 52, 53. An extended end of arms 52, 53 is connected by a conventional chain linkage means 54 to a downwardly extended end of the subframe elements 45, 46. A pivotal movement of control handle 50 will effect rotation of shaft 51 which will in turn effect a pivotal movement of the control arms 52, 53. A pivotal movement of control arms 52, 53 will effect movement of chain elements 54 which will in turn effect an angular displacement of the subframe 44 about the pivot support shaft 49.

As shown in FIG. 2, the control arm 50 is secured in a set position by means of a chain element 55 which is secured adjacent one end to the control arm 50 and is adapted to be releasably connected within a bayonet-type connection 56 provided in an upstanding support bracket 57. Support bracket 57 is secured to an upper surface of the tool bar 11. The bayonet-type connection 56 is detailed to permit the chain 55 to be inserted therethrough and locked therein in a selected number of adjusted positions which will in turn hold the control handle 50 in a set position against counterclockwise rotation thereof. The chain linkage means 54, 55 will permit the subframe assembly 44 to be freely displaced upwardly about pivot support shaft 49 but will prevent a downward displacement beyond a set position.

As shown in FIGS. 1 and 2, the frame support mechanism includes a rotatable drive means operable for effecting movement of the conveyor mechanism 100, as will be described in more detail hereinbelow. The drive means includes a support bracket means 60 secured to and extending rearwardly from the tool bar 11 substantially midway between the support brackets 13, 14. A gear box means 61 is supported on an upper surface of bracket 60 and includes a conventional driving input shaft 62. Shaft 62 is adapted to be connected by conventional universal drive means to a power take off shaft of a tractor means.

Extending outwardly from one lateral side of the gear box 61 is an output shaft 63. An extended end of the output shaft 63 is journaled for rotation in an upstanding bracket means 64 which is secured to frame element 23. A conventional pulley means 65 is secured to an outwardly extended end of shaft 63. A drive from pulley 65 is delivered by means of a conventional belt means 66, as shown in FIG. 1, to a pulley means 67. Pulley means 67 is fixed to a rightward extended end of rotatable shaft 49. A driving input into the gear box 61 by shaft 62 will effect rotation of shaft 63 which will in turn effect rotation of pulley 67 through the belt and pulley means 65, 66. Rotation of the pulley means 67 will effect a corresponding rotation of shaft 49 to drive the conveyor mechanism 100, as will be described in more detail hereinbelow.

As shown in FIG. 4, an idler pulley means 68 is operatively associated with an upper run of belt 66. Idler pulley 68 is provided for adjusting the tension on belt 66 and to provide means whereby the belt can be readily removed from the pulley support means 65, 67 and replaced when needed. The idler pulley 68 is rotatably supported by means of a rearwardly extending link means 69 which is pivotally supported on the upstanding bracket 64. An adjustable control means is provided between the frame 23 and pulley 68 for effecting pivotal movement of link 69 to thereby adjust pulley 68. The adjustable control means includes an internally threaded sleeve 70 and an externally threaded rotatable crank means 71. Crank 71 is rotatably supported in a collar 72. Collar 72 is secured to the frame element 23. A retaining element 73 is secured to control shaft 71 below collar 72 to prevent axial displacement of the control shaft 71 through collar 72 in the direction of sleeve 70. Rotation of the crank 71 is effected by means of a control handle 74. The above described adjustable control pulley 68 will permit the belt 66 to be adjusted to provide an effective driving relationship between the pulley 65 and pulley 67 and to be adjusted to a displaced position to allow belt 66 to be removed therefrom and replaced when needed.

PEANUT DIGGING MEANS

As shown in FIGS. 1, 2 and 4, the peanut digging means 80 includes a pair of laterally spaced digging assemblies 81, 82. Each of the digging assemblies 81, 82 includes a substantially upright shank member 83 having an upwardly directed V-shaped notch 84 complementary to a surface portion of the tool bar 11. The shank members 83 are secured to the tool bar 11, as shown in FIGS. 1, 2 and 4, by means of a substantially inverted U-shaped connecting bolt 85. The U-shaped connecting bolt 85 includes a substantially V-shaped base portion and a pair of downwardly directed leg members which are inserted through complementary openings formed adjacent opposite edges of the V-shaped notch 84. The extended ends of bolt leg members are provided with threaded portions for receiving conventional threaded connecting nuts 86. The threaded nuts 86 and U-shaped bolt 85 are effective for securely clamping the shank members 83 to the tool bar 11. As shown in FIGS. 1 and 2, a bearing plate means 87 is secured between an upper surface of tool bar 11 and the internal surface of U-shaped connecting bolt 85. Bearing plate means 87 will provide additional rigidity to the connection between the tool bar 11 and support shank 83.

A severing blade means 88 is secured to the downwardly extended end of each of the shank members 83 by means of a mounting plate 89. Mounting plate 89 is secured to shank member 83 by means of a pair of spaced upstanding bracket members 90, 91. Bracket members 90, 91 are detailed to provide a space therebetween for receiving the lower end of shank members 83. Shank members 83 and bracket members 90, 91 are provided with a pair of aligned apertures extending therethrough for receiving a pair of connecting bolt means 93, for securely clamping the shank members 83 within the space provided between bracket members 90, 91.

As shown in FIGS. 1 and 2, a plurality of rearwardly directed and upwardly inclined tine elements 94 are secured to a rear edge of the blade severing means 88, by conventional connecting means (not shown). The blade severing means 88 is provided with a sharpened forward edge 95 which is adapted to be moved in traversing relationship beneath the peanuts, to thereby sever the tap root system of the peanut plants. The severing blade means 88 is inclined slightly upward and rearward to direct the peanuts upward from their growing implacement within the ground. The plurality of tine elements 94 are laterally spaced relative to each other and located on a rear edge of the severing blade means 88. Tines 94 are inclined upwardly and rearwardly to elevate the peanut plants to a position above the ground. The lateral spacing between the tines 94 will permit a substantial portion of the soil surrounding the peanuts to be displaced therethrough and allowed to return to the ground.

As shown in FIGS. 1 and 4, each of the digging assemblies 81, 82 includes an elongated peanut vine deflecting rod 96. The peanut vine deflecting rod 96 is secured adjacent its lower end to the mounting plate means 89 by conventional connecting bolt means (not shown) and is formed to extend angularly inward in upwardly inclined relationship over the conveyor mechanism 100. The vine deflecting rods 96 of the two digging assemblies 81, 82 converge inwardly toward each other and terminate in a downwardly curved end portion located above the discharge end of the conveyor mechanism 100. The supporting relationship of the vine deflecting rods 96 will be described in more detail hereinbelow in the description of the conveyor mechanism 100.

Referring now particularly to FIGS. 1, 2 and 4, the peanut digging means includes a rolling colter disc 97. The colter disc 97 is rotatably supported by a conventional bearing means and support shaft between a pair of linkage members 97a. Linkage members 97a are connected adjacent an upper extended end to a pivot bolt means 97b. Pivot bolt 97b is secured in a lower depending end of a forwardly directed framework means 97c. The linkage supporting framework 97a, 97b and 97c will permit the rolling colter disc 97 to pivot upward about pivot bolt 97b. Rolling colter disc 97 is urged downwardly about pivot 97b by a pair of spring assemblies 97d.

Figure 6:
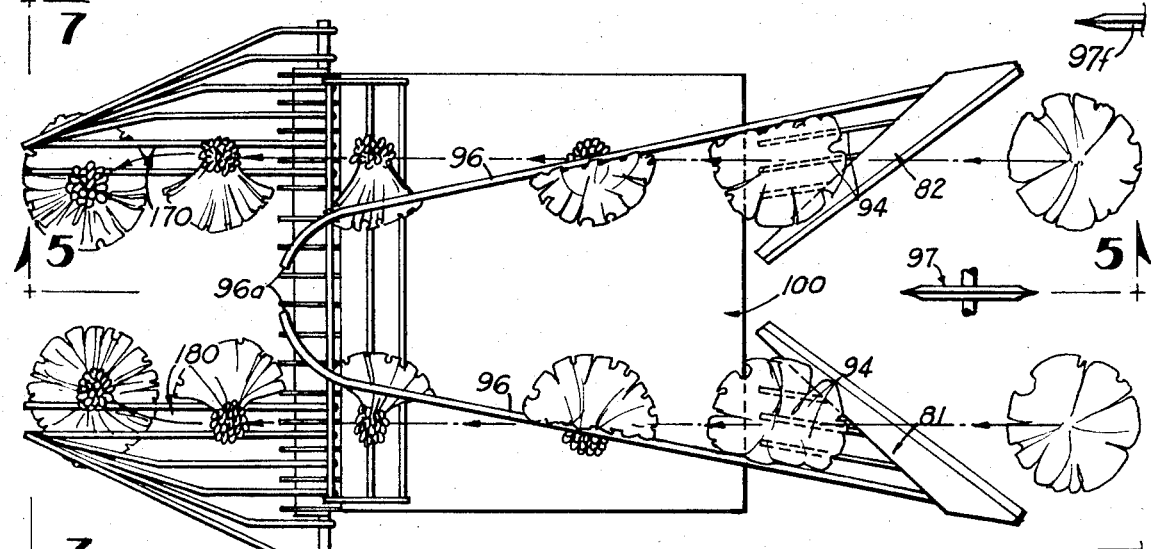
FIG. 6 is a schematic plan view of the root crop harvesting apparatus of the present invention illustrating the path of movement of peanut plants in a pair of adjacent rows in a harvesting operation.

Spring assemblies 97d are connected between lower depending ends of linkage 97a and bracket means 97e which are fixed to an upper portion of framework 97c. The spring assemblies 97d are of conventional construction and will permit supporting rods of the spring assemblies to be displaced upwardly relative to brackets 97e and include a compression spring which will spring urge the rolling colter disc 97 downwardly about the pivot bolt means 97b. The rolling colter disc 97 is located substantially midway between the digging assemblies 81, 82. The function of the rolling colter disc 97 is to sever the vines between adjacent rows of peanut plants being dug whereby the vine network of each row will be separated to permit the vines of the two rows to be angularly displaced by the windrowing assembly tine elements 170, 180. As shown in FIG. 6, a pair of colter disc 97f and 97g are mounted on the support tractor by conventional means (not shown). Colter discs 97f and 97g are supported at a detailed laterally spaced relationship for severing the vine network on the outside of the two adjacent rows in a fashion similar to that performed by the colter disc 97 between rows to permit the above described angular displacement in an inverting and windrowing operation.

CONVEYING MECHANISM

As shown in FIGS. 1-4, the conveying mechanism 100 includes a pair of endless chain members 101, 102. Endless chain 101 is supported adjacent frame element 45 of the said subframe assembly 44. Endless chain 101 is supported adjacent an upper discharge end of the conveyor mechanism by means of a sprocket 103 which is fixed to the rotatable drive shaft 49. Endless chain 101 is supported adjacent a lower end of frame element 45 by means of a sprocket 104 which is fixed to rotatable shaft 49a adjacent frame element 45. An idler roller means 105 is rotatably supported by a conventional stud shaft means (not shown) on an inner surface of frame element 45, adjacent an intermediate portion thereof. Idler roller 105 is detailed for rotatably supporting an intermediate portion of the upper run of endless chain 101.

As shown in FIG. 2, endless chain 102 is supported adjacent frame element 46 of the subframe assembly 44. Endless chain 102 is supported adjacent an upper discharge end of the conveyor mechanism by means of a sprocket 106 which is secured to rotatable drive chaft 49 adjacent frame element 46. Endless chain 102 is supported adjacent a lower end of frame element 46 by means of a conventional sprocket (not shown), which is secured to rotatable shaft 49a adjacent frame element 46. An idler roller means 107 is rotatably supported on the inner surface of frame element 46 adjacent an intermediate portion thereof by means of a conventional stud shaft support means.

Endless chains 101, 102 are provided with idler rollers 105a, 107a, respectively, for supporting an intermediate portion of the lower run of the respective chains. Idler rollers 105a, 107a are supported on an underside of frame elements 45, 46 by bracket support means 105b, 107b, respectively.

Figure 3:
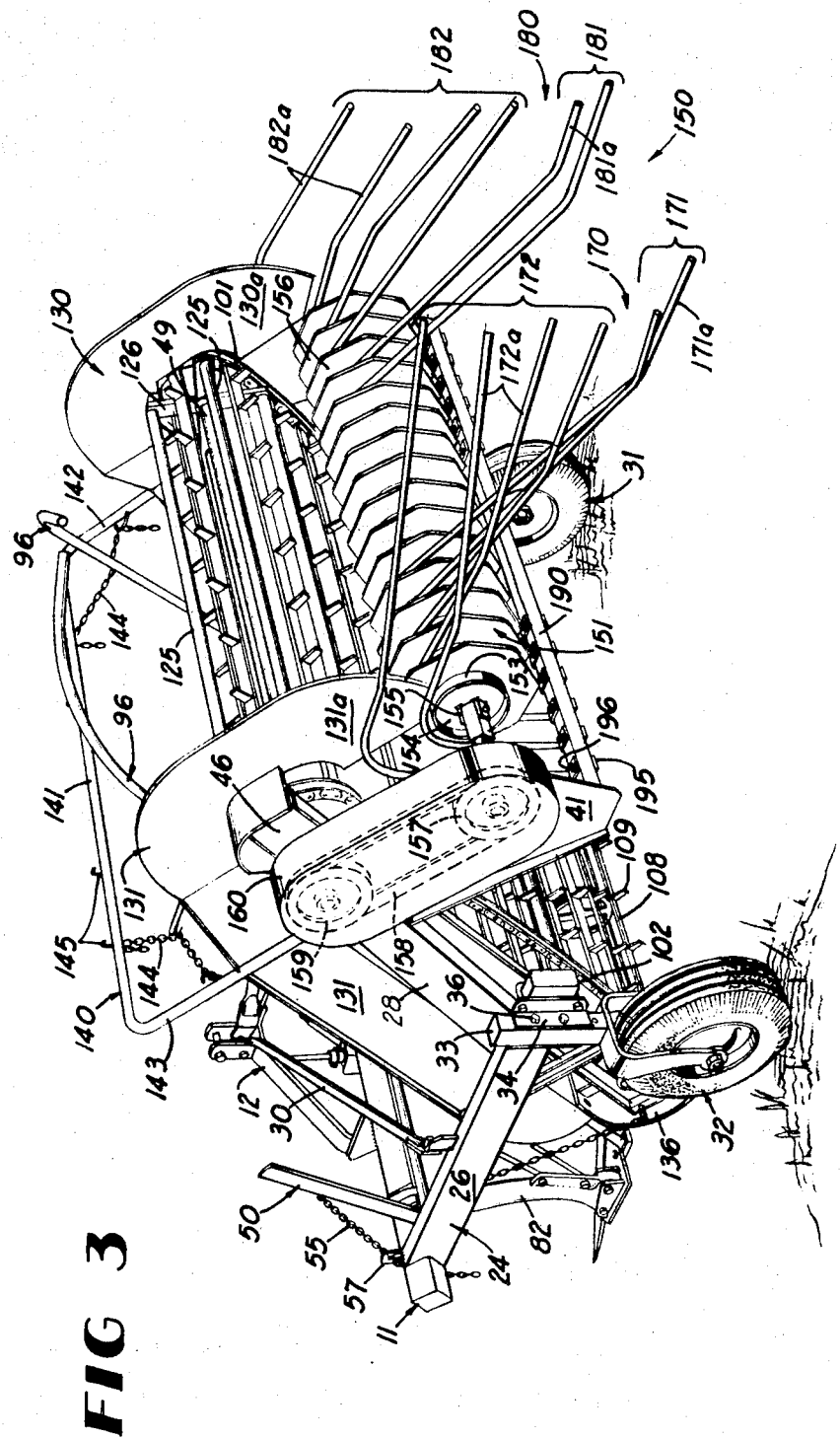
FIG. 3 is a perspective view as seen from the left rear of FIG. 1.

As shown in FIGS. 1, 3 and 4, the conveyor mechanism 100 includes a plurality of cross support bars 108 which are secured at their opposite ends to the endless chain members 101, 102 by a conventional connecting means (not shown). Cross support bars 108 are linearly spaced around the length of endless chain members 101, 102 to provide an effective support surface for supporting peanut vines for movement from a position adjacent the digging mechanism 80 to a position for discharge over the rotatable shaft means 49. Each of the cross support bars 108 includes a plurality of outwardly projecting lug means 109. Lug means 109 are equally spaced across the length of bars 108 and are provided for engaging the vines to assist in moving the vines upwardly from the digging mechanism to the discharge position.

As shown in FIGS. 1, 2 and 4, means is provided for removing additional soil particles by imparting a jolting action to the upper run of the conveyor mechanism 100. The conveyor jolting means includes a roller assembly supported at an intermediate portion of bars 108. The roller assembly also provides additional support in an intermediate area of the conveyor mechanism, which area will carry a substantial portion of the weight of the peanuts and vines moving upwardly along the inclined path. The roller assembly includes a plurality of rollers 110. Rollers 110 are detailed in a vertical elevation to be spaced slightly above the normal path of movement of conveyor cross bars 108 whereby advancement of bars 108 over rollers 110 will have a jolting effect on the conveyor mechanism 100. Rollers 110 are rotatably supported by means of support shafts 111. The opposite ends of shafts 111 are supported for vertical adjustment in selected vertically spaced openings formed in a pair of angle support members 112. Angle support members 112 are secured in laterally spaced relationship to define a space therebetween for receiving and rotatably supporting rollers 110. Angle members 112 are secured in laterally spaced relationship by means of conventional U-shaped connecting bolts 113. The U-shaped connecting bolts 113 are secured around the cross connecting rods 47, 48 of subframe assembly 44. The leg portions of the U-shaped connecting bolts 113 extend upwardly through openings provided in the angle support members 112 and including conventional threaded connecting nuts for securely clamping the angle members in position on the cross support rods 47, 48.

As shown in FIGS. 1-4, opposite ends of the rotatable support shaft 49a are adjustably supported adjacent the lower depending end of frame elements 45, 46 by an adjustable bearing mounting means 115. The adjustable bearing mounting means includes a conventional bearing element 116 which rotatably supports opposite ends of rotatable shaft 49a. Bearing element 116 is secured to a slidable plate member 117. Plate member 117 is slidably supported within the channel-shaped frame elements 45, 46. Channel-shaped frame elements 45, 46 are provided with an elongated slot means (not shown) which would permit the shaft 49a to be adjusted relative thereto. Adjustment of the bearing 116 and mounting plate 117 is effected by means of a conventional threaded shank member 118 which is fixed to the slidable mounting plate 117 by conventional means (not shown), such as welding. An extended end of the threaded shank 118 extends through a complementary opening provided in a plate member 119. Plate member 119 is fixed within the channel of frame elements 45, 46 in spaced relationship to the bearing means 116. Adjustable locking nuts 120, 121 are threadably supported on the threaded shank member 118 on opposite sides of fixed plate 119. Adjustment of the threaded locking nuts 120, 121 will effect movement of the bearing 116 and slidable mounting plate 117 within the channel of frame elements 45, 46, thereby adjusting rotatable shaft 49a and the sprockets 104, which support a lower end of the conveyor mechanism. The adjustable mechanism 116, 117, etc., for supporting rotatable shaft 49a will permit the tension on the conveyor mechanism to be varied and will also permit adjustment of the conveyor mechanism to allow the conveyor chain elements 101, 102 to be removed and replaced when needed.

A rotatable vine lifter means is operatively associated with the conveyor mechanism 100 adjacent the upper discharge end thereof for assisting in lifting the peanut vines from the conveyor lug members 109 and for directing the vines rearwardly for discharge to the windrow mechanism.

As shown in FIGS. 1, 3 and 4, the rotatable lifter means includes a plurality of lifter bars 125. Each of the lifter bars 125 is supported at its opposite ends by a pair of angularly aligned arms 126. Arms 126 are secured to rotatable shaft 49 and extend radially outward therefrom. The lifter bars 125 are secured to the extended ends of arms 126 with the radial distance from shaft 49 being sufficient to allow the outer surface of lifter bar 125 to project above or beyond the extended end of the lug elements 109. Each pair of arms 126 which support opposite ends of lifter bars 125 are angularly spaced substantially 90° relative to each other around rotatable shaft 49, such that the arms 126 and striker bar 125 will be received within the space between adjacent cross-bars 108 of the conveyor mechanism. The lifter bars 125 are detailed to extend substantially the full width between the endless chain members 101, 102 of the conveyor mechanism. The function of the lifter bars 125 is to aid in lifting the peanut vines off the conveyor lug mechanism 109 and to direct the peanut vines rearwardly onto the windrowing mechanism.

Shield means 130, 131 are located on opposite sides of the conveyor mechanism. The shield means 130, 131 are secured to the frame elements 45, 46 by a pair of upstanding bracket support means 132, 133. The shield means 130, 131 are detailed in dimension to extend from adjacent the lower end of frame elements 45, 46 upwardly along frame elements 45, 46 and terminate above the upper discharge end of the conveyor mechanism 100. The shield means 130, 131 terminate in downwardly directing shield elements 130a, 131a, as shown in FIG. 3. Shield means 130, 131 are detailed in height sufficiently to maintain peanut vines in position traveling upwardly along the inclined path of the conveyor mechanism 100.

As shown in FIGS. 1-4, additional shield means 135, 136 are provided around the lower extending end of the frame elements 45, 46. The shield means 135, 136 will prevent peanut vines or other foliage from becoming lodged against the forward edges of frame elements 45, 46 during a peanut harvesting operation.

A protective housing 137 is provided around the drive pulley 65 and idler pulley 68. Additional protective housing means 138 is provided around the drive pulley 67, as shown in FIG. 1.

Referring now particularly to FIGS. 1, 3 and 4, the peanut vine deflecting rods 96 extend upwardly in converging relationship over the conveyor 100 and terminate in downwardly curved end portions 96a. Deflecting rods 96 are supported in spaced relationship above the conveyor mechanism 100 by means of a supporting frame element 140. The supporting frame element 140 is substantially inverted U-shaped in design and includes a base portion 141, and a pair of depending leg members 142, 143. Legs 142, 143 are secured to the conveyor shield means 130, 131, respectively, by conventional connecting bolt means.

Each of the deflecting rods 96 includes a supporting arm 96b which extends radially outward therefrom, as shown in FIGS. 1 and 4. The arms 96b of rods 96 are secured to the support frame 140 by means of a chain linkage 144 which is secured adjacent an intermediate portion thereof to an extended end of arms 96b, with the opposite ends of the chain linkage 144 being secured respectively to the support frame base portion 141 and one of the leg members 142, 143.

The support mechanism including supporting frame 140 and chain linkage means 144 will permit the deflecting rods 96 to deflect upwardly relative to the conveyor mechanism 100, but will maintain the deflecting rods 96 in spaced position outwardly of the conveyor lug elements 109, substantially as shown in FIG. 4. Chain linkage means 144 is secured to the supporting frame 140 by means of hook elements 145. The frame 140 includes a number of spaced hook elements 145 which will permit adjustment of the chain linkage 144 relative to the supporting frame 140, thereby allowing the lateral spacing or angular converging relationship of the deflecting rod 96 to be varied.

WINDROWING MEANS

As shown in FIGS. 1-4, the windrowing means 150 is supported to the rear and below the discharge end of the conveyor mechanism 100 by means of the framework support plates 40, 41 described hereinabove. The support plates 40, 41 are provided with adjusting means such as a plurality of spaced openings (not shown) whereby the windrowing means 150 can be precisely positioned parallel to frame members 27, 28. The windrowing means will be described with reference to a rotatable peanut vine directing means 151 and a pair of windrowing assemblies 170, 180.

Figure 8:
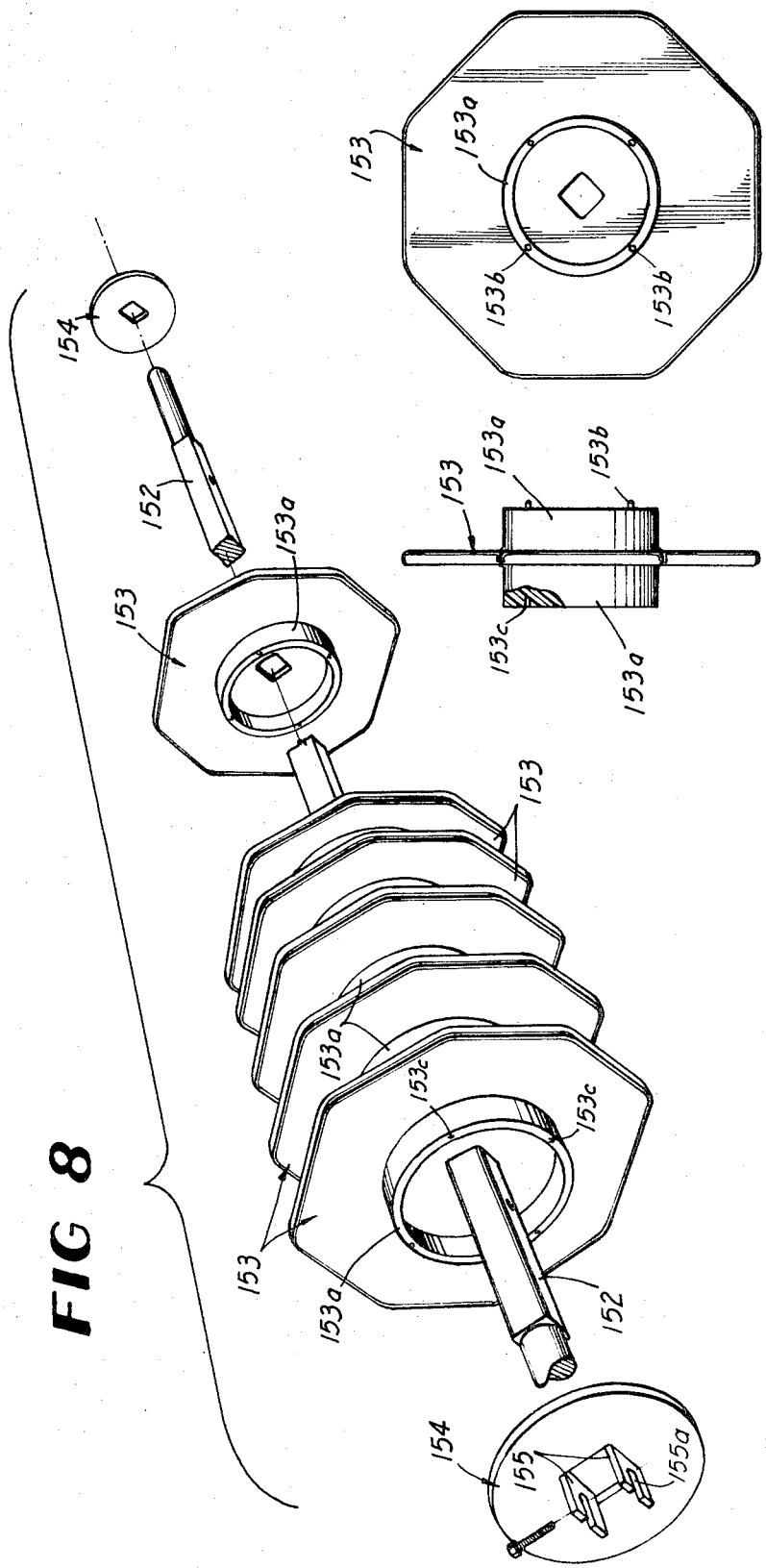
FIG. 8 is a fragmentary exploded perspective view of one of the crop directing disc assemblies.
Figure 10:
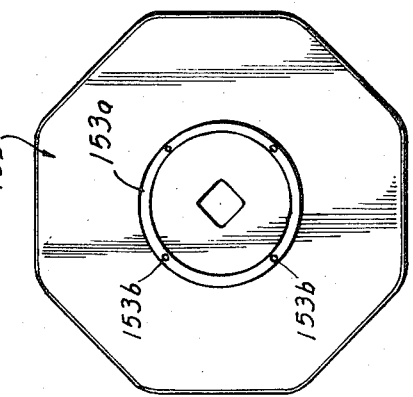
FIG. 10 is a side elevation of FIG. 9.
Figure 9:
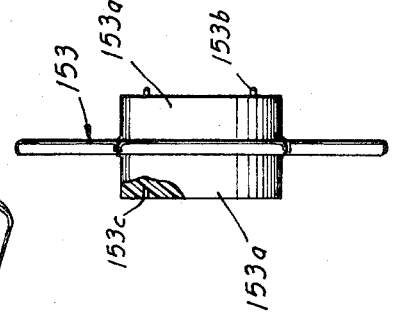
FIG. 9 is an enlarged end elevational view of one of the disc elements shown in FIG. 8.

The rotatable peanut directing means includes a support shaft 152 rotatably supported by conventional bearing means within the plate elements 40, 41. As shown in FIG. 8, a plurality of crop directing disc elements 153 are coaxially supported on shaft 152. Each of the disc elements 153 is constructed in the shape of an eight-sided figure, with the intersecting points between each of the sides of the figure being slightly rounded to present a smooth outer edge for contacting and directing the peanut laden vines rearwardly in a harvesting operation. Each of the crop directing disc 153 is provided with a substantially square opening concentrically arranged therein and detailed for receiving a complementary square surface portion of shaft 152, whereby rotation of shaft 152 will effect a corresponding rotation of disc 153. The crop directing disc 153 are supported in axially spaced relationship on shaft 152, with the axial spacing being controlled by collar means formed integrally with each of the disc elements 153. Each disc 153 is provided with a concentrically arranged circular collar 153a axially extending a detailed distance from each side of the disc. One of the disc collars 153a is provided with a number of axially extending alignment projections 153b and the other disc collar 153a is provided with a corresponding number of aligned complementary openings 153c.

In an assembled relationship, the axial edge of a collar 153a of one disc is in abutting contact with an axial edge of an adjacent disc collar and the projections 153b are fitted within the aligned complementary openings 153c. The crop directing discs 153 are secured in an axially set position on rotatable shaft 152 by means of a pair of end plate members 154. The end plate members 154 include axially extending bracket means 155 which are supported on opposite sides of the shaft 152 and include a conventional connecting bolt means 156 extending through complementary openings on shaft 152 and elongated adjustment slots 155a formed in brackets 155.

The eight-sided configuration of disc elements 153, with smooth rounded corners and with the collar means 153a will ensure that the peanut laden vines are directed rearwardly without becoming entangled around the rotary support shaft 152.

The number of discs 153 and axial dimensions of disc collars 153a are detailed such that the rotary crop directing means will extend substantially the full width of the conveyor mechanism 100, as shown in FIG. 3. The crop directing shaft 152 is driven in a counterclockwise direction, as shown in FIG. 4, by means of a sprocket 157 fixed to the leftward extended end of shaft 152 on an opposite side of plate 41. Sprocket 157 is driven by a conventional chain 158. Chain 158 is in driving engagement with sprocket 157 and sprocket 159. Sprocket 159 is fixed to a left extended end of shaft 49. A rotary movement of shaft 49 in a counterclockwise direction (FIG. 4) will effect a corresponding counterclockwise direction of movement of sprocket 159, chain 158, sprocket 157 and shaft 152. A protective housing means 160 is provided on the frame support means for surrounding the chain and sprocket drive means 157-159.

The windrowing means 150 includes a pair of tine assemblies 170, 180. Each of the tine assemblies 170, 180 includes a pair of inboard tines 171, 181 and four outboard tines 172, 182, respectively. The tine assemblies 170, 180 are supported on the windrowing means 150 in laterally spaced relationship to define a free space therebetween. The free space between the tine assemblies 170, 180 is centered relative to the conveyor mechanism and centered relative to the digging assemblies 81, 82, whereby a pair of adjacent rows being dug by the digging assemblies 81, 82 and conveyed upwardly by the conveying mechanism 100 can be directed inwardly to a windrow aligned with the free space between the laterally spaced tine assemblies 170, 180.

As shown in FIGS. 3 and 4, each of the tines of the two tine assemblies 170, 180 are secured to a cross-supporting bar 190. Opposite ends of the cross-supporting bar 190 are secured to a lower end of the supporting plate members 40, 41. Opposite ends of the bar 190 include a pair of oppositely directing bracket members 191, 192 which are provided thereon in detailed location to be in abutting contact with the internal surface of plate members 40, 41. Bracket means 191, 192 are secured to plate members 40, 41 by means of a pair of conventional connecting bolts 193 which are inserted through openings provided in brackets 191, 192 and aligned openings 194 provided in plate members 40, 41.

Adjustment of the supporting bar 190 relative to the plates 40, 41 is provided by means of a plurality of openings 194. Openings 194 are formed in plate members 40, 41 along an arcuate path having a radius concentric with the axis of rotatable shaft 152. The detailed location of the openings 194 relative to the axis of shaft 152 will permit the tine elements to be angularly adjusted relative to frame members 27 and 28 about the axis of shaft 152. Each of the tine elements of the two tine assemblies 170, 180 includes a substantially U-shaped connecting member 195 detailed to be inserted around the supporting bar 190, substantially as shown in FIG. 3. A tine member is secured in a laterally set position relative to bar 190 by means of a conventional connecting bolt 196 which is inserted through complementary openings provided in the legs of the U-shaped member 195 and through the connecting bar 190.

As shown in FIG. 4, each of the tine elements of the two tine assemblies 170, 180 extends upwardly from supporting bar 190 around the rotatable directing means in a counterclockwise direction and includes a rearwardly extended portion. The tine elements of the two tine assemblies 170, 180 are detailed in lateral spacing relative to the rotatable crop directing means such that a tine is located between adjacent axially spaced disc elements 153, as shown in FIG. 3. The height of the tine elements relative to the rotatable crop directing means 150 is detailed such that the tines are located below the outer circumferential edge and spaced from the collars 153a of the crop directing discs 153, as shown in FIG. 4.

Figure 7:
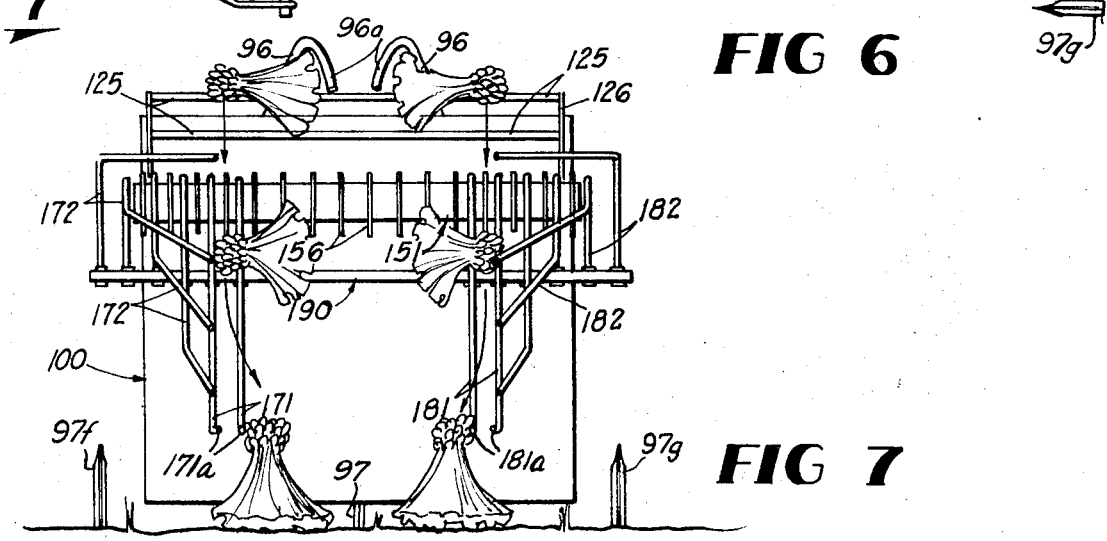
FIG. 7 is an elevational schematic view taken substantially along line 7—7 of FIG. 6 showing the path of peanut plants during their free fall to the ground.

As shown in FIGS. 3, 4, 6 and 7, the two inboard tines 171, 181 of each of the tine assemblies extend upwardly over the rotatable crop directing drum 153 and extend rearwardly therefrom in a downwardly inclined relationship. The inboard tines 171, 181 are longitudinally aligned in substantially parallel relationship relative to each other and are aligned relative to the path of movement of peanut vines moving upwardly over the conveyor mechanism 100. The inboard tines 171, 181 extend downwardly and terminate in an end portion 171a, 181a arranged substantially parallel to the operating ground surface. The length and height of inboard tines 171, 181 are detailed such that the end portions 171a, 181a will remain in contact with the peanuts on a vine after the vine has contacted the ground and is supported thereon, substantially as shown in FIG. 7. With the peanut laden vines in contact with the ground and the peanuts engaged by tine end portions 171a, 181a, a forward motion of the tines in a harvesting operation will produce a slight dragging and twisting effect of the vines as the peanuts are displaced from tine end portions 171a, 181a thereby assuring that the vines are completely inverted with the peanuts supported above the vines.

Figure 5:
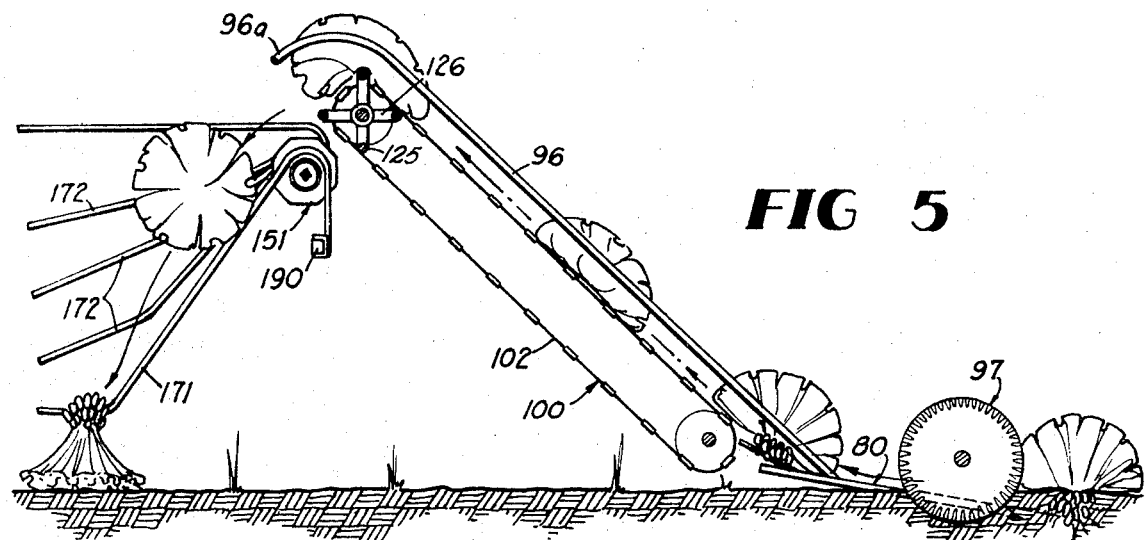
FIG. 5 is a vertical schematic view taken substantially along line 5—5 of FIG. 6 showing a path of movement of peanuts in a digging and windrowing operation.

As shown in FIGS. 3, 4, 6 and 7, the outboard tines 172, 182, of each of the tine assemblies include four tine elements. Each of the outboard tine elements 172, 182 extends upwardly from the cross-supporting bar 190 in a counterclockwise direction around the surface of drum 153, substantially as shown in FIG. 4. Outboard tine elements 172, 182 extend rearwardly in a first direction substantially parallel to each other and longitudinally aligned relative to the path of peanuts moving up the conveyor mechanism 100 and terminate in angularly disposed end portions 172a, 182a. The outboard tines 172a, 182a also are inclined downwardly through various angular inclinations. The various angular inclinations of the outboard tines 172a, 182a are detailed such that the outboard tine located closest to the inboard tines includes an end portion which is located substantially above the outermost inboard tine, with each of the other outboard tines being vertically spaced thereabove, as the tine element moves laterally outward, as shown in FIGS. 5-7.

The tine assemblies 170, 180 are laterally spaced relative to each other and detailed in fore-and-aft alignment and angular inclination whereby a peanut vine moving rearwardly on the conveyor mechanism 100 and falling on the crop directing mechanism 151 will be directed rearwardly such that the peanut laden portion of the vine contacts the outboard tines 172, 182, substantially as shown in FIGS. 6 and 7 whereby the vine portions are caused to fall downwardly within the free space located between the two tine assemblies 170, 180. A contact of the peanut laden portion of the vine by the outboard tines 172, 182 will restrict movement thereof and thereby effect an angular displacement of the peanut vines through substantially ninety degrees, whereby the peanuts will be inverted above the vines, as shown in FIG. 7.

MODIFICATION OF THE WINDROWING MEANS

Figures 11, 12:
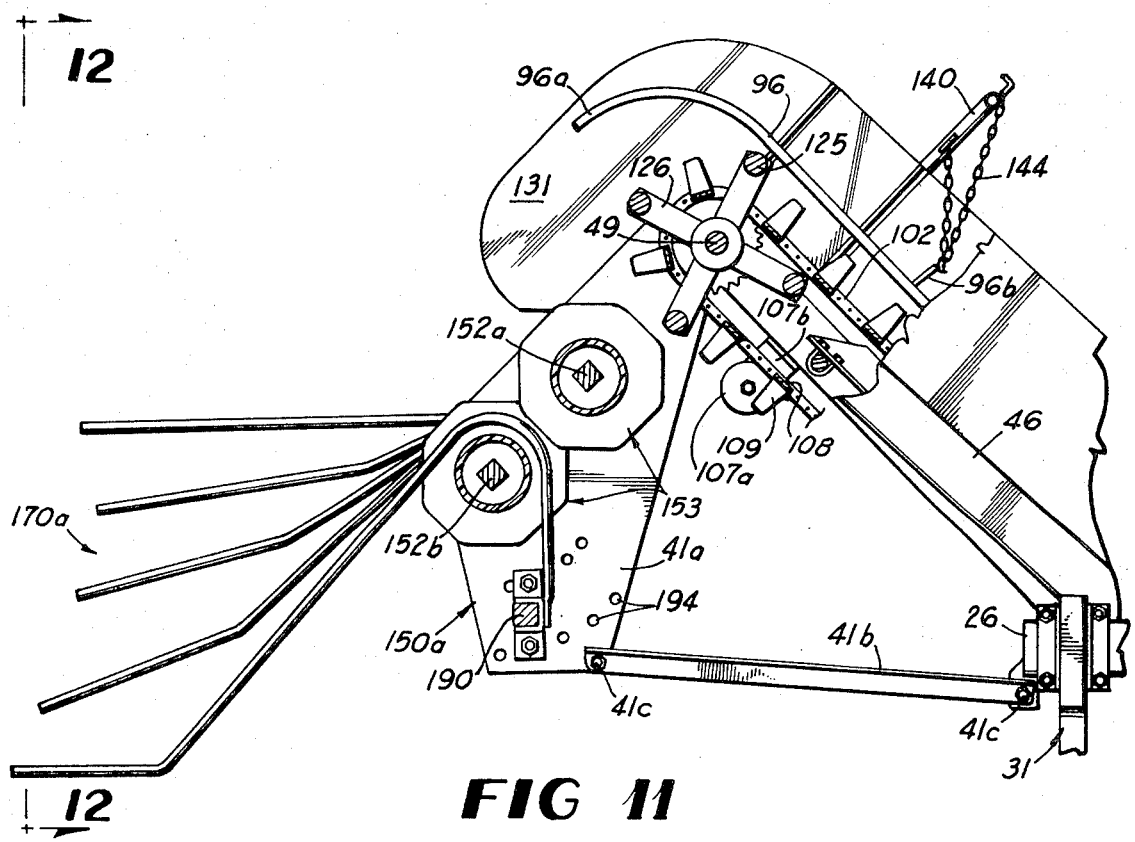
FIG. 11 is a fragmentary vertical sectional view showing a modification of the windrowing means.
FIG. 12 is a rear elevation view taken along line 12—12 of FIG. 11.

As shown in FIGS. 11 and 12, a modified windrowing means 150a is provided. The modified windrowing means 150a is for use in certain soil conditions where excessive amounts of soil are retained on the peanuts after having been dug and moved along the elevated paths by the conveyor means. The windrowing means 150a shown in FIGS. 11 and 12 will provide additional means for aiding in the separation of soil clinging to the cluster of peanuts. The windrowing means 150a is similar to the windrowing means 150 described herein above except that two rotary crop directing means are provided for directing the peanut laden vines rearwardly from the discharge end of the conveyor onto the windrowing tines.

As shown in FIGS. 11 and 12, the modified windrowing assembly 150a includes a pair of mounting plates 40a and 41a which are adapted to be attached to the underside of frame elements 27, 28 in substantially the same manner as mounting of the plate members 40, 41. Bracing link members 40b, 41b are connected between lower depending ends of the plate members 40a, 41a and the rearwardly extended ends of the frame elements 23, 24. The bracing link members 40b, 41b are secured adjacent their opposite ends in a bracing relationship by means of conventional connecting bolt means 40c, 41c.

A support shaft 152a is rotatably supported by conventional bearing means within the plate members 40a, 41a. A second support shaft 152b is rotatably supported by conventional bearing means within the plate elements 40a, 41a. Shaft 152b is supported in parallel spaced relationship relative to shaft 152a. The axis of shaft 152b is detailed to be located below and rearwardly spaced of the axis of shaft 152a. Each of the rotatable shafts 152a, 152b are provided with a plurality of crop directing disc elements 153. Reference is made to the above description of the windrowing means 150 for details of construction of the crop directing disc 153.

As shown in FIG. 12, the rotatable crop directing disc 153 supported on shaft 152b is detailed to be axially spaced substantially midway between the rotatable crop directing disc 153 supported on shaft 152a. The spacing of shafts 152a, 152b are detailed such that the crop directing disc 153 of the two shafts are overlapping relative to each other, substantially as shown in FIGS. 11 and 12.

Shaft 152a is driven in a harvesting operation by means of a conventional chain 158a which is supported in driving engagement with a first sprocket 157a mounted on an extended end of shaft 152 and supported in driving engagement with a second sprocket 159a supported on an extended end of rotary drive shaft 49. In a harvesting operation, shaft 152a and its supported crop directing disc 153 will be driven in a counterclockwise direction, as shown in FIG. 11. A drive from shaft 152a is delivered to shaft 152b by means of a chain 158b. Chain 158b is supported in driving engagement with a first sprocket 157b which is fixed to an extended end of shaft 152a opposite from sprocket 157a and supported in driving engagement with a second sprocket means 157c supported on an extended end of shaft 152b, as shown in FIG. 12. A counterclockwise rotation of shaft 152a will effect a corresponding counterclockwise rotation of shaft 152b with its crop directing disc 153.

The windrowing means shown in FIGS. 11 and 12 include a pair of tine assemblies 170a, 180a. The tine assemblies 170a, 180a are substantially identical to the tine assemblies described hereinabove in the first windrowing means 150 and reference is made to the above description of the tine assemblies for details of the tine assemblies 170a, 180a.

In utilizing the digger shaker inverter embodying the principles of the present invention, either of the windrowing means 150 shown in FIGS. 1–7 or the windrowing means 150a shown in FIGS. 11 and 12 can be utilized therewith. As indicated hereinabove, the particular windrowing means which is to be utilized will be controlled by the soil conditions in which the peanuts are grown.

OPERATION

In operation, the peanut harvesting apparatus embodying the principles of the present invention is supported on a conventional tractor vehicle by means of a conventional three-point linkage system which is connected to the framework connecting pins 20–22. After the three-point linkage system of a suitable tractor vehicle has been connected to the pins 20–22, the power input drive shaft 62 is connected by suitable conventional universal connecting means to a power takeoff of the tractor vehicle. A rotary driving input to shaft 62 is effected by operating conventional control mechanism on the tractor which will in turn effect a rotation of the conveyor mechanism 100 and rotatable crop directing means 151.

After the digger shaker inverter has been supported on a tractor, a peanut digging and windrowing operation is effected by moving the vehicle with peanut digger shaker inverter into position straddling a pair of adjacent rows to be dug and adjusting the linkage support mechanism of the tractor to allow the transverse cutting plates 88 to penetrate the ground sufficiently to sever the tap root and the root system beneath the clusters of peanuts and with the rolling colter disc 97, 97f and 97g engaging the ground to sever the vines between adjacent rows as described above. With the digging assemblies properly adjusted, a peanut digging operation is performed by advancing the tractor longitudinally along the rows.

After the root system has been severed below the cluster of peanuts, tine elements 94 of the digging assemblies will elevate the peanuts to a position above the ground. The spaced tines 94 will permit a substantial portion of the soil to be displaced from the peanuts through the space therebetween. A continued movement of the digging assemblies 80 will elevate the peanuts above the ground and will allow the conveyor mechanism 100 including transverse conveyor bars with lug members 109 to engage the peanuts and advance the peanuts upwardly along inclined spaced parallel paths. As the peanuts move upwardly along the inclined spaced parallel paths, deflecting rods 96 will contact the vine or foliage portion and thereby effect an angular displacement of the vines inwardly toward each other. The angular displacement effected by the deflecting rods 96 will be substantially 90°, thereby moving the peanuts from a substantially upright growing position to a substantially horizontal position lying on the conveyor 100. Movement of peanuts by the conveyor 100 will also shake loose any additional soil clinging to the peanuts and will allow the soil to fall freely to the ground in front of the windrow being formed.

As the plants reach the rearward or discharge end of the conveyor mechanism, they are lifted gently by the lifter rods 125, previously described, out of the engagement with the lugs 109 and are thus expelled gently rearward to fall by gravity onto the rotatable crop directing means 151.

Peanut plants which are discharged by the conveyor mechanism 100 will be oriented in a substantially horizontal position with the vine portions directed inwardly toward each other and with the peanut portions directed outwardly. The peanut plants discharged by the conveyor mechanism will fall by gravity onto the rotatable crop directing disc elements 156 in the horizontal position and will be directed by the disc elements 156 rearwardly onto the windrowing tine assemblies 170, 180. As the peanut plants are directed rearwardly onto the tine assemblies 170, 180, the peanut portion of the plants will contact the outboard tines 172, 182 substantially as shown in FIGS. 5-7 thereby restricting the downward fall of the peanut portion of the plants. Since the peanut vine portions have been displaced inward through a first ninety degree angular rotation by the deflecting rods 96, the vine portions will be located substantially above the free space between the two windrowing assemblies 170, 180 and will be allowed to fall freely to the ground within the free space. As the peanut vines fall by gravity to the ground the outboard tines 172, 182 will effect a second ninety degree angular rotation of the peanut vines thereby positioning the peanut portion above the vines. Further, in the process of inverting the peanut vines, the windrowing tine assemblies 170, 180 will displace the peanuts inwardly into a windrow which is centered in the free space between the tine assemblies and will be substantially centered between the pair of adjacent rows being dug.

It now becomes apparent that the illustrative embodiment embodying the principles of the present invention is capable of obtaining the above stated objects and advantages. It is obvious that those skilled in the art may make modifications in the details of construction without departing from the spirit of the invention which is to be limited only by the scope of the appended claims.

What is claimed is:

1. A root crop harvesting apparatus operable for digging spaced rows of root crop plants from their growing implacement, simultaneously elevating the dug root crop plants and separating soil therefrom and depositing the root crop plants in an inverted position with the crop roots disposed above the plant foliage comprising, in combination:
   a. digging means operatively associated with said harvesting apparatus for digging and removing root crop plants from their growing implantation in the ground;
   b. conveying means operatively associated with said harvesting apparatus for engaging said root crop plants removed from their growing implantation by said digging means and operable for conveying said plants along an upwardly inclined path to an elevated position and for separating soil therefrom;
   c. deflecting means operatively associated with said harvesting apparatus for effecting an angular displacement of said plants so that the plant foliage is directed toward the longitudinal centerline of said inclined path in response to conveying movement of said plants to said elevated position; and,
   d. plant orienting means operatively associated with said harvesting apparatus for receiving crop roots from said conveying means with the plant foliage directed toward the longitudinal center line of said crop harvesting apparatus and operable for inverting and depositing said plants on the ground with said crop roots disposed above the plant foliage.

2. A root crop harvesting apparatus as described in claim 1 further characterized in that said digging means includes a transverse severing means operable for traversing movement below the root crop plants growing in the ground and for effecting a severing of the plant root system below the root crops and including elevating means for elevating the plant to a position above the ground wherein the plant foliage is disposed above the root crop.

3. A root crop harvesting apparatus as described in claim 1 further characterized in that said conveying means includes movable conveying means operable for engaging said plants removed from said ground and for moving said plant along an upwardly inclined path to said elevated position and wherein said deflecting means operative for effecting said angular displacement of said plants includes means for contacting said plants moving along said upwardly inclined path and displacing said plants so that the plant foliage is directed toward the longitudinal centerline of said inclined path in response to conveying movement of said plants relative to said deflecting means.

4. A root crop harvesting apparatus as described in claim 1 further characterized in that said plant orienting means operative for receiving plants from said conveying means includes means defining a downwardly inclined deflecting means having means for engaging the root crop portion of said plants and operative for supporting the root crop portion of said plant during a falling movement by gravity of said plant foliage from said elevated position on said conveying means to said inverted position on said ground, said support of said root crop portion of said plant being effective for orienting said plant to said inverted position.

5. A root crop harvesting apparatus as described in claim 1 further characterized in that said digging means includes severing means operable for traversing movement beneath the root crop portion of said plants for severing said root system of said plants below said root crops and including a plurality of upwardly inclined tine means operative for elevating said plant to a position above the ground, said conveyor means includes movable conveying means operative for engaging said plant from said digging means and for moving said plant along an upwardly inclined path to said elevated position, said deflecting means effective for moving said plants to said position wherein said plant foliage is directed toward the longitudinal centerline of said inclined path including guide means operative for contacting the plant portion of said root crop plants and for angularly displacing said plants through approximately 90° of angular orientation in response to movement of said plants along said upwardly inclined path by said conveying means and wherein said plant orienting means operative for receiving plants from said conveying means includes a plurality of rearwardly extending spaced tine means defining a downwardly inclined path of movement of plants to the ground, with said tine means operative for engaging the root crop portion of said plants received from said conveying means and for retarding the fall by gravity of said plants to the ground and effective for orienting said plants to said inverted position in response to said falling movement to the ground.

6. A root crop harvesting apparatus, described in claim 1 further characterized in that said conveying means includes a movable conveying means operable for moving said root crop plants upwardly along said inclined path and wherein said deflecting means operative for displacing said plants wherein the plant foliage is directed toward the longitudinal centerline of said inclined path includes rod means supported above said conveying means and angularly disposed relative to said path of movement of said plant to said elevated position, and wherein said rod is operative for engaging the foliage portion of said plants and angularly displacing said plants through approximately 90° in response to conveying movement of said plants along said upwardly inclined path.

7. A root crop harvesting apparatus as described in claim 6 further characterized in that said rod means is connected at one end to said digging means structure and extends upwardly over said conveying means.

8. A root crop harvesting apparatus as described in claim 1 further characterized in that said crop orienting means operable for receiving said plants from said conveying means includes directing means rotatably operable for directing plants from said conveying means onto said orienting means and wherein said orienting means includes a number of rearwardly extending and spaced tine elements, with said tine elements defining a downwardly inclined gravitational path of movement of said plants from said elevated position to said position on said ground, with said tines effective for engaging the root crop portion of said plants and providing a supported movement of the root crop portion during said gravitational fall from said elevated position to said position on the ground, to thereby effect said orienting to said inverted position.

9. A root crop harvesting apparatus as described in claim 8 further characterized in that said rotatable directing means includes a number of axially spaced rotatable disc elements, with said tine elements extending upwardly over and around the axis of said rotatable disc elements and wherein said tine includes adjustable mounting means operable such that said tines can be angularly oriented relative to the rotatable axis of said disc elements.

10. A root crop harvesting apparatus as described in claim 1 further characterized in that said digging means includes means for digging and removing root crop plants from their growing implantation in the ground in adjacent pairs of laterally spaced rows, said conveying means operative for engaging said root crops removed from their growing implantation by said digging means from each of said rows and operable for conveying said plants of said two rows to said elevated position, said deflecting means including means for effecting an angular displacement of the plant foliage portion of each row inwardly toward each other and wherein said plant orienting means operative for receiving plant from said conveying means includes laterally spaced means defining downwardly converging deflecting surface means located on opposite sides of an open space and wherein said conveying means, said plant deflecting means and said orienting means are collectively operable for displacing the plant foliage of each of said rows inwardly and inverting the plants of each of said rows and depositing them in a windrow between said downwardly converging surface means.

11. A root crop harvesting apparatus operable for digging root crop plants from their growing implantation in adjacent pairs of plant rows, simultaneously elevating the plants from each of said rows while separating soil therefrom and depositing the root crop plants in an inwardly displaced position with the root crop plants in each row being inverted such that the crop roots are disposed above the plant foliage and with the effective width between the two rows being substantially reduced comprising, in combination:

a. digging means operatively associated with said harvesting apparatus for digging and removing root crop plants from their growing implantation in the ground in each of said rows;

b. conveying means operatively associated with said harvesting apparatus for engaging said root crop plants removed from their growing implantation by said digging means from each of said rows and operable for conveying said plants of said two rows along an upwardly inclined path to an elevated position and for separating soil therefrom; and, c. plant deflecting means operatively associated with said harvesting apparatus and operatively associated with said conveying means for contacting plants moving along said conveying means and displacing the plant foliage portion of each of said rows and directing the foliage portions inwardly toward each other with said plants of each of said rows being angularly displaced from a first position of orientation to a second position of orientation in response to conveying movement of said plants to said elevated position; and, d. plant orienting means defining a pair of windrowing means for intercepting the plants discharged from said conveying means from said two rows and operable for forming a compact windrow thereof which is centered between the two rows, said pair of windrowing means defining a free space therebetween through which the plant and foliage portion can fall generally freely therethrough to said windrow, with each of said windrowing means including downwardly inclined deflecting means for engaging the root crop portion of said plants and operative for orienting said plant to a third position of orientation in response to said free falling movement of said plants from said conveying means to the ground, and wherein said third position of orientation of said plant is in said inverted position with the crop roots disposed above the plant foliage and lying along the top portion of the windrow.

12. A root crop harvesting apparatus as described in claim 11 further characterized in that each of said windrowing means includes a set of tines, with said tines of each of said windrow means extending rearwardly from a position below said elevated position of said conveying means and along opposite lateral sides of said free space for engaging the root crops of said plants and inverting them.

13. A root crop harvesting apparatus as described in claim 12 further characterized in that said windrowing means includes rotatable directing means rotatably operable for engaging plants received from said conveying means and for directing said plants onto said windrowing means.

14. A root crop harvesting apparatus as described in claim 10 further characterized in that said windrowing means includes a rotatable plant directing means having a number of axially spaced disc elements, with each of said windrowing means including a set of tine elements connected adjacent one end to a support means and extending upwardly over and around the axis of said directing means with the extended end portions of said tines formed to define a downwardly inclined path of movement for engaging said root crop portion of said plants and for orienting said plants to said inverted position.

15. A root crop harvesting apparatus as described in claim 13 further characterized in that said means for supporting said tines includes means for adjusting said tines about said axis of said rotatable directing means wherein said extended end portions of the said tines can be moved to a number of radially extended positions extending from said rotatable axis of said directing means.

16. A root crop harvesting apparatus as described in claim 13 further characterized in that said harvesting apparatus includes colter means located on said harvesting apparatus for severing the vines between adjacent rows prior to digging the root crop plants, whereby the vines of said adjacent rows are separated from each other.

17. A digging and windrowing apparatus for peanut plant row crops, comprising in combination:
 a. a frame adapted to travel along the ground surface in straddling relation to an adjacent pair of peanut plant rows;
 b. means on said frame for digging the peanut plants of said rows;
 c. conveyor means carried by said frame for receiving the dug peanut plants and conveying the root and peanut portions of the plants of the said rows along parallel paths extending rearwardly and upwardly to elevated positions where the plants are discharged to fall by gravity to the ground behind the apparatus;
 d. means overlying said conveyor means for deflecting the peanut plant vines to lie down onto the region between said paths with the plant foliage directed inwardly for discharge while in such positions; and
 e. windrowing means for intercepting the discharged plants from the two rows to form a compact windrow thereof which is centered between the two rows, said windrowing means including a pair of windrowing assemblies defining a free space therebetween below and behind which the windrow is formed and each being aligned generally with a respective one of said paths principally to intercept the peanut portions of the plants and support them during their downward travel toward the ground while the vine portions of the plants fall generally freely into said free space whereby the plants are inverted and the peanut portions thereof are caused to lie along the top portion of the windrow.

18. The digging and windrowing apparatus as defined in claim 17 further characterized in that each of said windrowing assemblies comprises a set of tines, each set of tines including at least one inboard tine and at least one outboard tine, said inboard tines being fore-and-aft aligned generally with and below an associated path and extending in rearwardly, downwardly inclined relationship from the frame, said outboard tines including an extended portion angularly disposed relative to said path and wherein said angularly disposed portions of said two sets of tines converge inwardly toward said free space, with the extended portions of said outboard tines being vertically spaced above the extended portions of said inboard tines.

19. The digging and windrowing apparatus as defined in claim 18 further characterized in that each of said set of tines includes a number of inboard tines and a number of outboard tines and wherein said number of outboard tines include extending angularly converging end portions with the end portions of said outboard tines being vertically spaced relative to each other.

20. The digging and windrowing apparatus as defined in claim 19 further characterized in that the angled end portions of said outboard tines are inclined downwardly in said converging relationship.

21. The digging and windrowing apparatus as described in claim 17 further characterized in that said apparatus includes rotatable directing means located on said frame means adjacent the discharge end of said conveyor and operable for directing peanut vines received from said conveyor rearwardly onto the windrowing means and into said free space between said windrowing assemblies.

22. The digging and windrowing apparatus as described in claim 21 further characterized in that said rotatable directing means includes a number of axially spaced rotatable directing discs and wherein each of said windrowing assemblies comprises a set of tines, each set of tines including a number of inboard tines and a number of outboard tines, with the tines of each set axially spaced among said rotatable disc elements, said inboard tines being substantially fore-and-aft aligned with and below an associated path and having a free end extending rearwardly in downwardly inclined relationship from said rotatable disc means, said outboard tines being laterally spaced outward of said inboard tines and including extended end portions angularly disposed relative to said path.

23. Harvesting apparatus for use in windrowing crops in a harvesting operation comprising, in combination:
 a. frame support means;
 b. rotatable crop directing means supported on said frame means, said rotatable crop directing means including a plurality of axially spaced crop directing elements, said crop directing elements being rotatably operable for receiving a crop introduced thereto and for directing said crop along a path extending transversely to the rotatable axis of said crop directing means; and c. windrowing means supported on said frame means and operatively associated with said crop directing means for intercepting said crops directed from said crop directing means, said windrowing means including a pair of windrowing assemblies, said windrowing assemblies being supported on said frame means at axially spaced locations relative to said rotatable crop directing means and defining a free space therebetween through which a crop can pass, said windrowing means being operable for receiving a crop from said crop directing means, operable for reducing the effective width of the received crop and operable for directing said crop through said free space defined between said axially spaced windrowing assemblies and wherein each of said windrowing assemblies comprises a set of tines, each set of tines including at least one inboard tine and at least one outboard tine, said inboard tines being fore-and-aft aligned generally with and below said crop directing path and extending in rearwardly, downwardly inclined relationship from the frame support means and having a portion adjacent its free end which extends substantially parallel to the ground, said outboard tines including an extended portion angularly disposed relative to said path and wherein said angularly disposed portion of said two sets of tines converge inwardly toward said free space, with the extended portions of said outboard tines being vertically spaced above the extended portions of said inboard tines.

24. Harvesting apparatus as described in claim 23 further characterized in that each of said set of tines includes a number of inboard tines and a number of outboard tines and wherein each of said outboard tines include angularly converging end portions with the end portions of said outboard tines being vertically spaced relative to each other.

25. Harvesting apparatus as described in claim 24 further characterized in that the angled end portions of at least some of said outboard tines are inclined downwardly in said converging relationship.

26. Harvesting apparatus as described in claim 23 further characterized in that each of said tines extends from a supported position on said frame means over the rotatable axis of said crop directing means and wherein said tine support means includes means for angularly adjusting said tines about said rotatable axis of said crop directing means.

27. Harvesting apparatus for use in digging root crop plants from their growing implantation comprising; crop digging means having a transversely extending severing means operable for movement beneath the crop root portion of a plant for severing the tap root system, said digging means including a number of laterally spaced tine elements extending upwardly in inclined relationship from a trailing edge of said severing means and operable for elevating a root crop from its growing implantation to a position above the ground and deflecting means operatively associated with said digging means for contacting the foliage portion of said root crop plants for effecting an angular displacement of the root crop plants from a substantially upright growing position to a substantially horizontal position.

28. Harvesting apparatus as described in claim 27 further characterized in that said digging means is supported at a lower end of a substantially upright shank means and wherein said shank means includes attachment means provided on an upper end thereof whereby said digging means can be supported on a tool bar support member.

29. Harvesting apparatus for use in digging root crop plants from their growing implantation comprising, in combination:

a. an elongated tool bar supporting member;
b. a pair of root crop digging assemblies supported on said tool bar in laterally spaced location, each of said digging assemblies including a transversely extending severing means, with the severing means of said two assemblies angularly disposed in converging relationship with each other, each of said severing means including a number of laterally spaced upwardly inclined tine elements and wherein each of said digging assemblies includes an elongated crop deflecting means, with said crop deflecting means of said two assemblies angularly disposed relative to each other to converge inwardly, said severing means being operable for severing the tap root system below the root crop of a plant, with the tine elements operable for elevating the root crop plants to a position above the ground and with the crop deflecting means operable for angularly displacing the crops from a substantially upright growing position to a substantially horizontal position, causing the plants to lie down in a region between a pair of adjacent rows being dug.

30. A root crop harvesting apparatus for row crops, comprising, in combination:

a. frame means adapted to travel along the ground surface in straddling relation to an adjacent pair of crop rows;
b. colter means operatively associated with said harvesting apparatus for severing crop vines between adjacent rows in response to longitudinal movement along said rows, whereby the vines of said adjacent rows are separated from each other;
c. means on said frame means for digging the crops of said rows;
d. conveying means operatively associated with said harvesting apparatus for engaging said root crops removed from their growing implantation by said digging means and operable for conveying said crops of said adjacent rows along an upwardly inclined path; and,
e. deflecting means operatively associated with said conveying means for contacting crops moving along said inclined path by said conveying means and operable for displacing the foliage of the crops of each of said rows inwardly toward each other, with the crops of said rows being angularly displaced from a first substantially upright growing position to a substantially horizontal position in response to conveying movement of said crops along said inclined path.

31. A method of harvesting root crops which have a root and nut portion and a foliage portion including the steps of:

a. digging root crop plants from their growing implantation in the ground;

b. elevating the dug root crop plants along a predetermined path to an elevated position and separating soil therefrom as the root crop plants move along said predetermined path;

c. contacting a portion of said root crop plants moving along said predetermined path and displacing said plants angularly to a position that is substantially perpendicular to said predetermined path in response to movement therealong;

d. discharging said root crop plants from said elevated position to permit free fall by gravity of the foliage portion of said root crop plants to the ground; and, e. supporting the root and nut portion of said root crop during the free fall of the foliage portion to the ground so that the root crop will be deposited on the ground in a windrow with the root and nut portion being on top of the foliage portion.

32. Harvesting apparatus for use in windrowing and inverting crops in a harvesting operation comprising, in combination:

a. frame support means;

b. a pair of horizontally spaced parallel arranged rotatable crop directing means supported on said frame means, each of said rotatable crop directing means including a plurality of axially spaced crop directing disc, said crop directing disc being rotatably operable for receiving a crop introduced thereto and for directing said crop along a path extending transversely to the rotatable axis of said crop directing means; and c. windrowing means supported on said frame means and operatively associated with said crop directing means for intercepting said crop directed from said crop directing means, said windrowing means including a pair of windrowing assemblies, said windrowing assemblies being supported on said frame means at axially spaced locations relative to said rotatable crop directing disc to define a free space therebetween through which a crop can pass, said windrowing means being operable for receiving a crop from said crop directing means, operable for reducing the effective width of the received crop and operable for deflecting said crop through said free space defined between said axially spaced windrowing assemblies and wherein each of said windrowing assemblies comprises a set of tines, each set of tines including at least one inboard tine and at least one outboard tine, said inboard tines being fore-and-aft aligned generally with and below said crop directing path and extending in rearwardly, downwardly inclined relationship from the frame support means and having a portion adjacent its free end which extends substantially parallel to the ground, said outboard tines including an extended portion angularly disposed relative to said path and wherein said angularly disposed portion of said two sets of tines converge inwardly toward said free space, with the extended portions of said outboard tines being vertically spaced above the extended portions of said inboard tines.

33. In a root crop harvesting apparatus having means for removing root crop plants which have a root and nut portion and a foliage portion from the growing implacement in the soil; means for conveying and elevating said removed plants from the ground and separating soil from said plants; and inverting means for inverting the root crop plants and depositing them on the ground in a windrow with the root and nut portion being disposed on top of the foliage portion; the improvement wherein said inverting means includes two sets of laterally spaced, rearwardly extending rods positioned beneath the upper end of said conveying means, each set of rods including at least one downwardly extending inboard rod having a portion adjacent its free end that extends rearwardly substantially parallel to the ground for supporting thereon the root and nut portion of said plant and an inwardly turned outboard rod for directing any outwardly disposed root and nut portion toward said inboard rod for support thereon so that the foliage portion of said plant will fall by gravity into the space between said sets of rods and beneath the root and nut portion that is supported on said inboard rod during downward travel toward the ground until said root and nut portion leaves the free end portion of said inboard rod for depositing the root crop on the ground in a windrow with the root and nut portion on top of the foliage portion.

34. In a root crop harvesting apparatus as defined in claim 33, the improvement wherein the inverting means is further characterized in that said inverting means also includes an outboard rod arranged substantially parallel to the ground.

35. In a root crop harvesting apparatus as defined in claim 33, the improvement wherein the inverting means is further characterized by an intermediate rod positioned between said outboard and inboard rod and turned inwardly toward said open space and inclined downwardly toward the ground.

36. In a root crop harvesting apparatus as defined in claim 33, the improvement wherein the inverting means is further characterized in that the terminal portions of said rods terminate substantially in a vertical plane.

37. In a root crop harvesting apparatus as defined in claim 33, the improvement wherein the inverting means is further characterized in that each rod has a vertical portion extending from its secured end.

38. In a root crop harvesting apparatus as defined in claim 33, the further improvement wherein means for orienting the root crop is provided while said root crop is being conveyed and elevated from the ground so that the foliage portion of the plants is directed toward the center of said conveyor means and aligned with the open space between said set of rods.

39. In a root crop harvesting apparatus as defined in claim 33, the improvement wherein means is provided for adjusting said inverting means with respect to the ground.

40. In a root crop harvesting apparatus as defined in claim 33, the improvement wherein said inboard rod is constructed and arranged to support said root and nut portion until said foliage portion frictionally engages the ground to assist said root and nut portion in leaving the free end portion of said rod.

* * * * *